United States Patent
Rougier et al.

(10) Patent No.: US 11,365,686 B2
(45) Date of Patent: Jun. 21, 2022

(54) SYSTEM FOR GENERATING ELECTRIC POWER FOR AN AIRCRAFT

(71) Applicant: SAFRAN, Paris (FR)

(72) Inventors: Florent Rougier, Moissy-Cramayel (FR); Stéphane Petibon, Moissy-Cramayel (FR); Jean-Philippe Hervé Salanne, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/263,202

(22) PCT Filed: Jul. 26, 2019

(86) PCT No.: PCT/FR2019/051859
§ 371 (c)(1),
(2) Date: Jan. 26, 2021

(87) PCT Pub. No.: WO2020/021214
PCT Pub. Date: Jan. 30, 2020

(65) Prior Publication Data
US 2021/0207543 A1 Jul. 8, 2021

(30) Foreign Application Priority Data
Jul. 27, 2018 (FR) .................................. 1857009

(51) Int. Cl.
*F02C 7/268* (2006.01)
*F01D 15/10* (2006.01)
*F01D 21/14* (2006.01)

(52) U.S. Cl.
CPC .............. *F02C 7/268* (2013.01); *F01D 15/10* (2013.01); *F01D 21/14* (2013.01);
(Continued)

(58) Field of Classification Search
CPC .... F02C 7/268; F01D 15/10; F05D 2220/768; F05D 2260/42; F05D 2260/85
See application file for complete search history.

(56) References Cited

U.S. PATENT DOCUMENTS 8,536,752 B2 * 9/2013 Katsumata ........... H02K 21/028
310/191
9,937,803 B2 * 4/2018 Siegel .................... B64D 27/24
(Continued)

FOREIGN PATENT DOCUMENTS

| EP | 1712761 A2 | 10/2006 |
|---|---|---|
| FR | 3056194 A1 | 3/2018 |
| WO | WO 2009/118298 A1 | 10/2009 |

OTHER PUBLICATIONS

English translation of Written Opinion issued in International Application No. PCT/FR2019/051859, dated Oct. 24, 2019 (11 pages).
(Continued)

*Primary Examiner* — Arun Goyal
(74) *Attorney, Agent, or Firm* — Bookoff McAndrews, PLLC

(57) ABSTRACT

Electrical power generation system for an aircraft, including: a gas turbine having a high-pressure shaft and outputting a gas flow to actuate a free turbine, a polyphase permanent magnet generator coupled to the gas turbine and able to output a first alternating voltage for supplying through first conversion means a primary power supply network of the aircraft, the free turbine and the permanent magnet generator being mounted on the same drive shaft concentric with the high-pressure shaft of the gas turbine, a starter mounted on the high-pressure shaft able to ensure the starting of the gas turbine, the starter being a permanent magnet starter/generator able to output a second alternating voltage for supplying a secondary power supply network of the aircraft and auxiliary equipment of the gas turbine and
(Continued)

the first conversion means include two first AC/DC converters controlled from a management unit.

6 Claims, 4 Drawing Sheets

(52) U.S. Cl.
CPC .. *F05D 2220/766* (2013.01); *F05D 2220/768* (2013.01); *F05D 2260/42* (2013.01); *F05D 2260/80* (2013.01); *F05D 2260/85* (2013.01)

(56) References Cited

U.S. PATENT DOCUMENTS

| | | | | |
|---|---|---|---|---|
| 10,443,511 | B2 * | 10/2019 | Ethier | H02J 3/32 |
| 10,480,408 | B2 * | 11/2019 | Munevar | F02C 7/32 |
| 10,766,629 | B2 * | 9/2020 | Mercier-Calvairac | B64D 27/26 |
| 10,773,814 | B2 * | 9/2020 | Strauss | B64D 31/06 |
| 2006/0017328 | A1 * | 1/2006 | Bryde | H02J 9/08 307/64 |
| 2011/0089691 | A1 * | 4/2011 | Jones | F01D 15/10 290/43 |
| 2018/0170564 | A1 | 6/2018 | Vaillant et al. | |
| 2020/0266629 | A1 * | 8/2020 | Spooner | G01R 31/346 |

OTHER PUBLICATIONS

Search Report dated Feb. 22, 2019, in FR Application No. 1857009 (2 pages).

English translation of International Search Report issued in International Application No. PCT/FR2019/051859 dated Oct. 24, 2019 (2 pages).

* cited by examiner

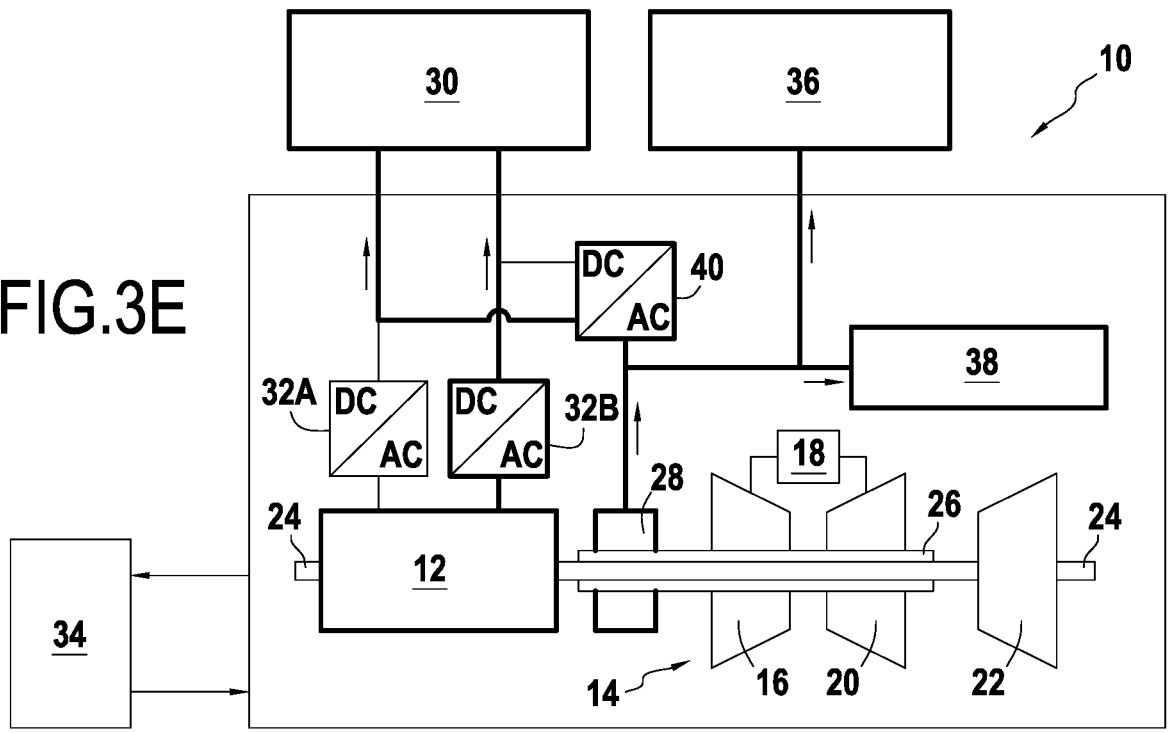

SYSTEM FOR GENERATING ELECTRIC POWER FOR AN AIRCRAFT

CROSS-REFERENCE TO RELATED APPLICATION(S)

This application is the U.S. national phase entry under 35 U.S.C. § 371 of International Application No. PCT/FR2019/051859, filed on Jul. 26, 2019, which claims priority to French Patent Application No. 1857009, filed on Jul. 27, 2018.

BACKGROUND OF THE INVENTION

The invention concerns the field of electrification of the propulsion of airplanes and other rotorcrafts and it relates more particularly to an electrical power generation system integrating a new architecture of turbogenerators for an aircraft.

Currently, at the gas turbines, there are mainly two technologies which are the connected turbines (for example the APU) or the free turbines (for example the helicopter turboshaft engines or the airplane turboprop engines). The mainly focus will be on these latter turbines, which are composed of a high-pressure body and of a low-pressure body integrating the free turbine.

In order to make a turbogenerator, the free turbine must be associated with an electrical generator. Several turbogenerator technologies exist but they are not always adapted to the different functions and operating modes sought for the propulsion of the aircrafts.

OBJECT AND SUMMARY OF THE INVENTION

The present invention therefore proposes an electrical power generation system for an aircraft, integrating a new architecture for a more versatile aeronautical turbogenerator and developing an electrical power comprised between 100 KW and 1 MW, typically 500 KW.

This aim is achieved with an electrical power generation system for an aircraft, including:
a gas turbine having a high-pressure shaft and outputting a gas flow to actuate a free turbine,
characterized in that it further includes a polyphase permanent magnet generator coupled to the gas turbine and able to output a first alternating voltage for supplying through first conversion means a primary power supply network of the aircraft, the free turbine and the permanent magnet generator being mounted on the same drive shaft concentric with the high-pressure shaft of the gas turbine,
a starter mounted on the high-pressure shaft able to ensure the starting of the gas turbine,
the starter being a permanent magnet starter/generator able to output a second alternating voltage for supplying a secondary power supply network of the aircraft and auxiliary equipment of the gas turbine and said first conversion means preferably include two first AC/DC converters controlled from a management unit.

The integration into the system of a starter/generator and of a permanent magnet generator allows obtaining good efficiency and good power density. In the absence of a monitoring element, the output voltage is however directly dependent on the speed of rotation and on the delivered power. In addition, with such an arrangement, in the event of a fault in one of the two first (advantageously bidirectional) converters, the other can continue to provide power to the primary power supply network or even to the secondary power supply network and to the auxiliary equipment through the second converter.

Advantageously, the system further includes second means for converting said second alternating voltage into a second direct voltage disposed between the permanent magnet starter/generator and the primary power supply network. Said second conversion means preferably include a second AC/DC (advantageously bidirectional) converter controlled from a management unit.

With such an arrangement, apart from the additional power provided by the second converter on the primary network when the two first converters are already active, in the event of an internal fault in the permanent magnet generator, the first concerned converter can be easily cut off and the other first converter still active can be used to deflux this permanent magnet generator (when the latter is a polyphase generator) through the second converter.

In addition, in normal operation, this second converter allows transferring power coming from the permanent magnet starter/generator to the primary power supply network and thus performing a transfer from HP to LP or vice versa. This allows optimizing the dimensioning of the turbine by reducing the various margins and in particular the surge margin.

Preferably, said management unit includes a monitoring function that allows detecting faults at the winding of the polyphase permanent magnet generator, the detected fault possibly being an inter-turn short-circuit or a phase-to-phase or phase-to-neutral short-circuit between the generator and the AC/DC converter.

Advantageously, said primary power supply network includes at least one electrical source or storage unit of the battery or super capacitor type and said secondary power supply network includes at least one electrical source or storage unit of the battery or super capacitor type.

The invention also concerns an aircraft including an electrical power generation system as mentioned above.

BRIEF DESCRIPTION OF THE DRAWINGS

The invention will be better understood upon reading the description given below by way of indication but without limitation with reference to the following figures in which.

DETAILED DESCRIPTION OF EMBODIMENTS OF THE INVENTION

Figure 1:
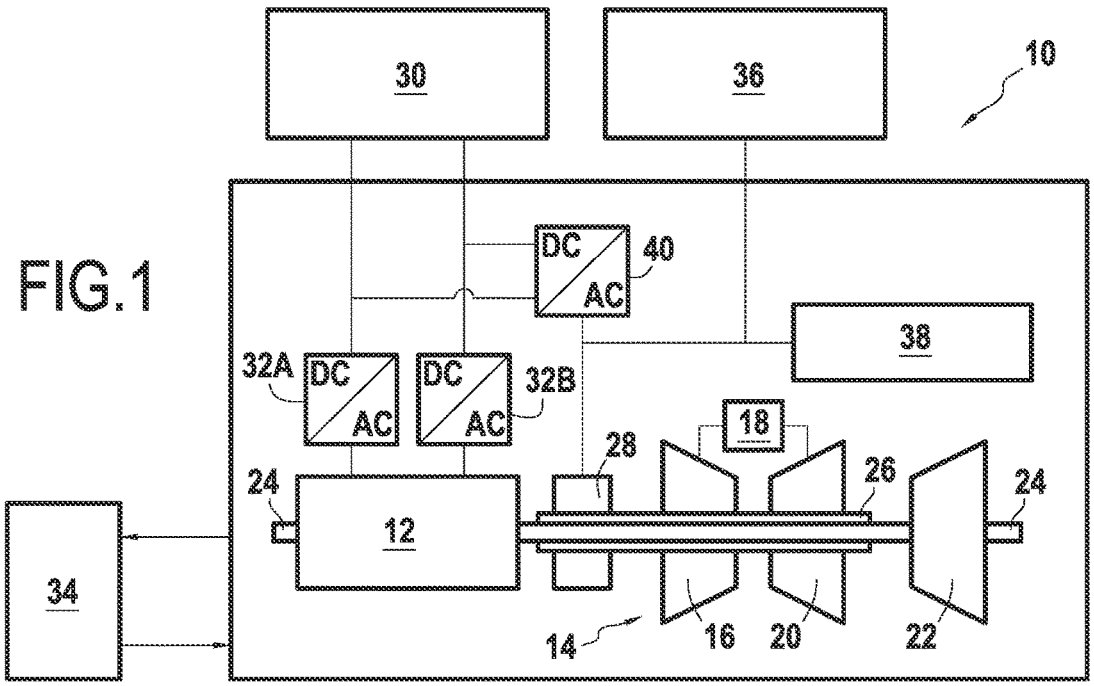
FIG. 1 shows architecture of an aeronautical turbogenerator according to the invention.

FIG. 1 shows an electrical power generation system 10 for an aircraft according to the invention, including an electrical generator 12 coupled to a gas turbine 14 to form what is commonly called aeronautical turbogenerator. The gas turbine which conventionally comprises a compressor 16, one or several combustion chambers (the gas generator 18) and a power turbine or high-pressure turbine 20, is of the type including a free turbine 22. The free turbine 22 and the electrical generator 12 are mounted on the same drive shaft 24 concentric with a shaft called high-pressure shaft 26 supporting the compressor 16 and the power turbine 20. This support shaft also supports an electrical starter/generator 28 ensuring the starting of the gas turbine.

The electrical generator 12 mechanically connected to the free turbine 22 is a permanent magnet generator (PMG) connected to a primary power supply network 30 by means of a first conversion means formed by two first advantageously bidirectional AC/DC converters 32A, 32B controlled from a management unit 34. The two converters each output a first direct voltage from a first alternating voltage outputted by the PMG.

The electrical starter/generator 28 mechanically connected to the high-pressure shaft 26 is a permanent magnet starter/generator (PMS/G) supplying a secondary network 36 and auxiliary equipment 38 of the gas turbine (such as the fuel injection pump or the lubrication and cooling devices). It is also connected to the primary power supply network 30 via a second conversion means formed by an advantageously bidirectional AC/DC converter 40 also controlled from the management unit 34. The converter 40 outputs a second direct voltage from a second alternating voltage outputted by the PMS/G.

The compressor 16 which ensures the compression of the air entering the gas generator 18 may include one or several stages and may be of the axial or centrifugal type or be formed by a combination of both. The power turbine 20 which receives the gas flow derived from the gas generator 18 may include one or several stages and may be radial or centrifugal or be formed by a combination of both.

The management of the aeronautical turbogenerator is generally ensured by the management unit 34 which consists of a dedicated calculator retrieving measurements and providing it with commands, in particular for starting and stopping the gas generator 18 or even defluxing the permanent magnet generator 12. This calculator can further integrate a monitoring function that allows detecting internal faults at the permanent magnet generator 12 and in particular short-circuits at its winding.

Figure 2:
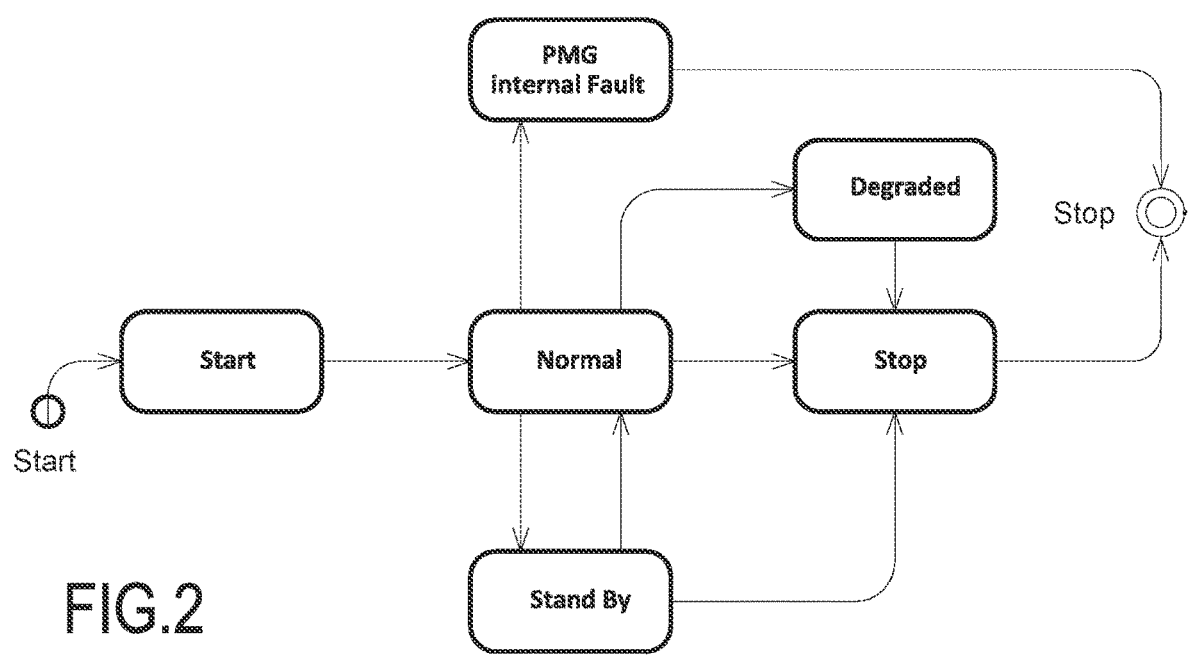
FIG. 2 illustrates the main operating modes of the aeronautical turbogenerator of FIG. 1, and FIGS. 3A to 3E describe the power flows implemented in the different operating modes of FIG. 2.

FIG. 2 illustrates in combination with FIGS. 3A to 3E, the main operating modes of the aeronautical turbogenerator of the invention and the power flows implemented during these different modes. For the sake of clarity of this disclosure, the various contactors that allow switching between operating modes, actuated selectively from the management unit 34 and disposed between the different elements of the system 10, have not been represented.

In start mode (start—FIG. 3A), the second AC/DC converter 40 connected to the PMS/G 28 is used in inverter mode in order to drive the high-pressure shaft 26 at an ignition speed allowing the starting of the gas generator 18 and to supply the auxiliary equipment 38 necessary for this starting. This operation of the second converter as an inverter involves drawing power from the primary power supply network 30, which implies that the latter includes at least one electrical source or storage unit (of the battery or super capacitor type, for example) to allow this initial drawing.

In current mode (normal—FIG. 3B), the gas turbine 14 then being in operation, the PMS/G 28 supplies in addition to the auxiliary equipment 38, the secondary power supply network 36. The PMG 12 driven by the free turbine 22 in turn supplies the primary power supply network 30. It should be noted that due to the bidirectionality of the second AC/DC converter 40, it is possible to transfer in this current mode power from the PMG to the PMS/G and conversely (i.e. power transfer between the high-pressure and low-pressure shafts) via this converter.

From the current mode, it is possible to switch into a stand-by mode (stand-by—FIG. 3C) in which the gas generator 18 is turned-off but the high-pressure shaft 26 and the free turbine 22 are driven from the primary power supply network 30 respectively by the PMS/G 28 and the PMG 12 at a speed allowing rapid re-ignition of this gas generator. It should be noted that, for the electrical generators 12 and 28 to operate in motor mode, it is necessary, as in the previous start mode, to draw via an electrical storage unit (or any other electrical source such as another turbogenerator or an auxiliary group for example) of the power on the primary power supply network 30 to ensure the operation of the different converters 32A, 32B, 40 as an inverter. Likewise, the secondary power supply network 36 continues to supply the auxiliary equipment 38, which implies that this secondary network includes, like the primary network, also an electrical source (however this supply could also come from the primary power supply network 30 via the second converter 40).

This mode can be useful for several use cases:

a) in the case of a bi-turbogenerator aircraft in which one aeronautical turbogenerator is used at its nominal power and the other is used as a backup in the event of failure of the first one. This mode has the advantage of allowing a quick restarting.

b) in the event of a significant charge release on the primary power supply network in order to prevent the aeronautical turbogenerator from overspeeding. The fuel supply is kept to a minimum allowing reducing the power, but it cannot be cut off to prevent the drawing of the gas generator. By using this mode, it can be afforded to turn off the gas generator in order to reduce power more quickly and then turn it on again as soon as the need for power increases.

Figure 3A:
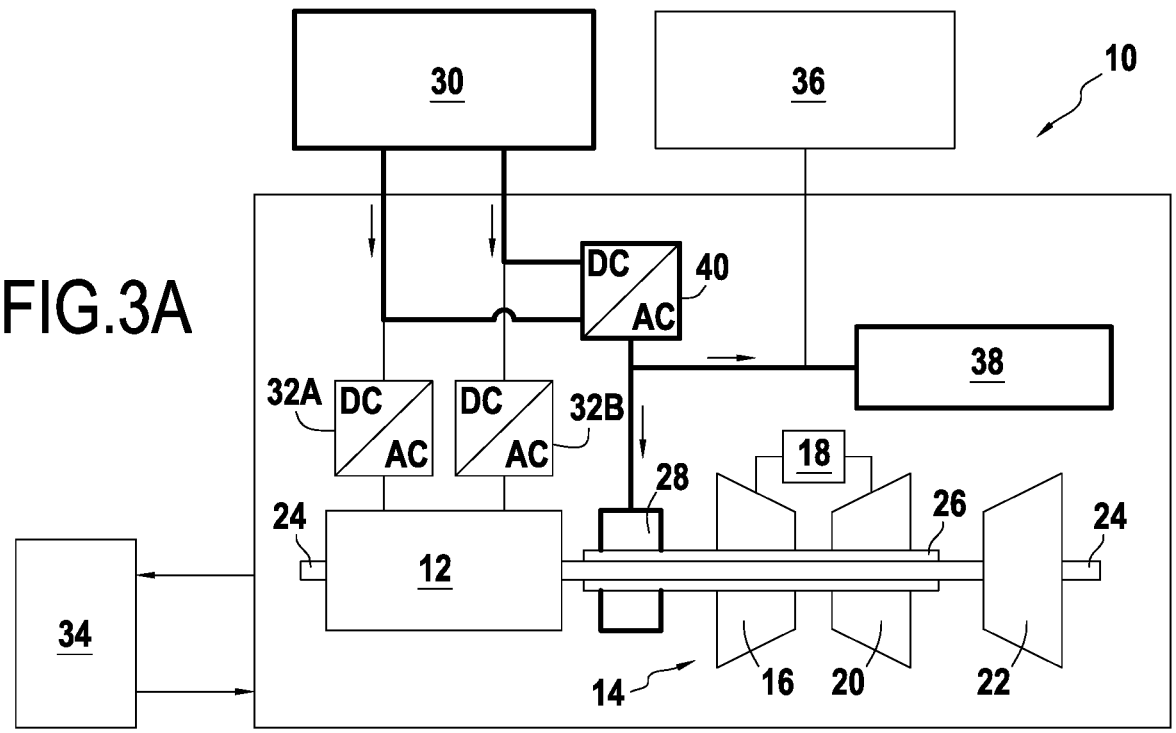
Figure 3B:
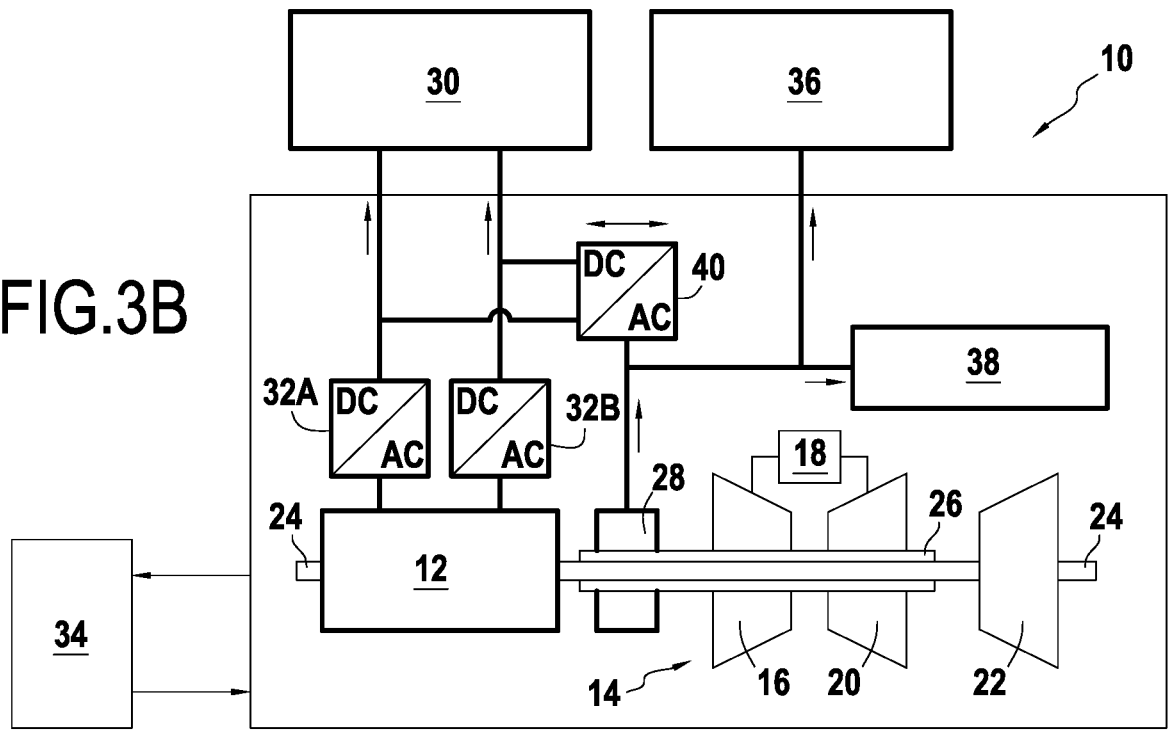
Figure 3C:
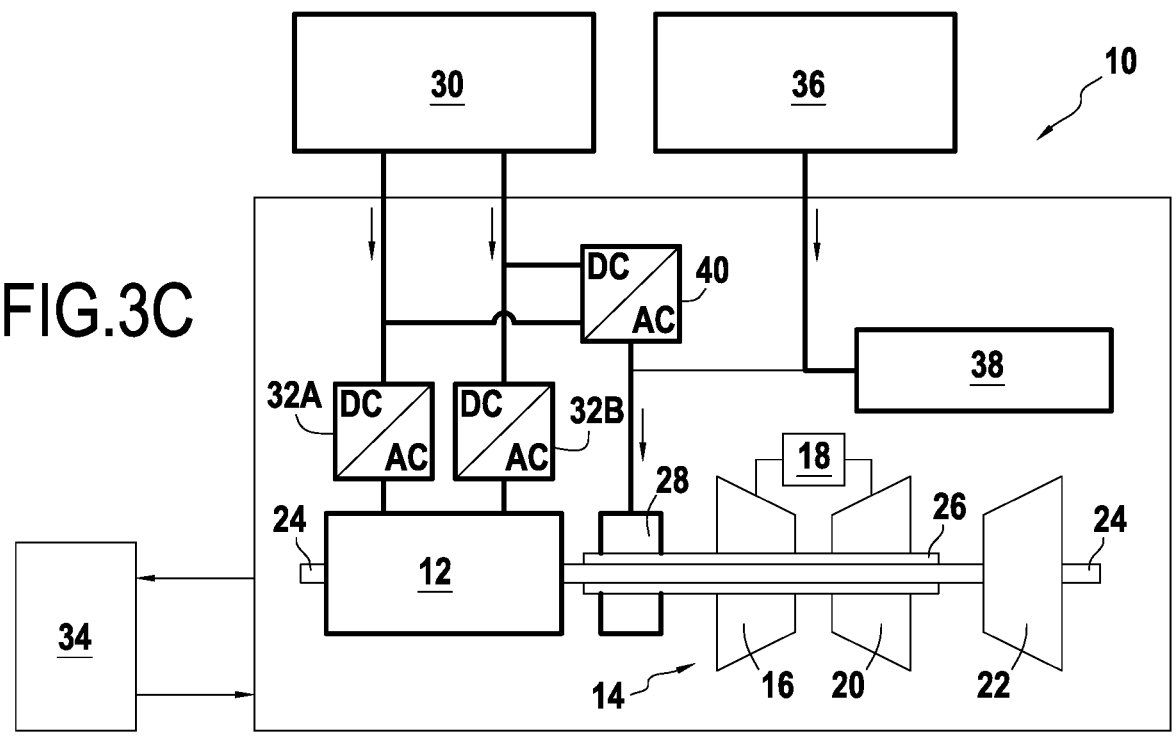
Figure 3D:
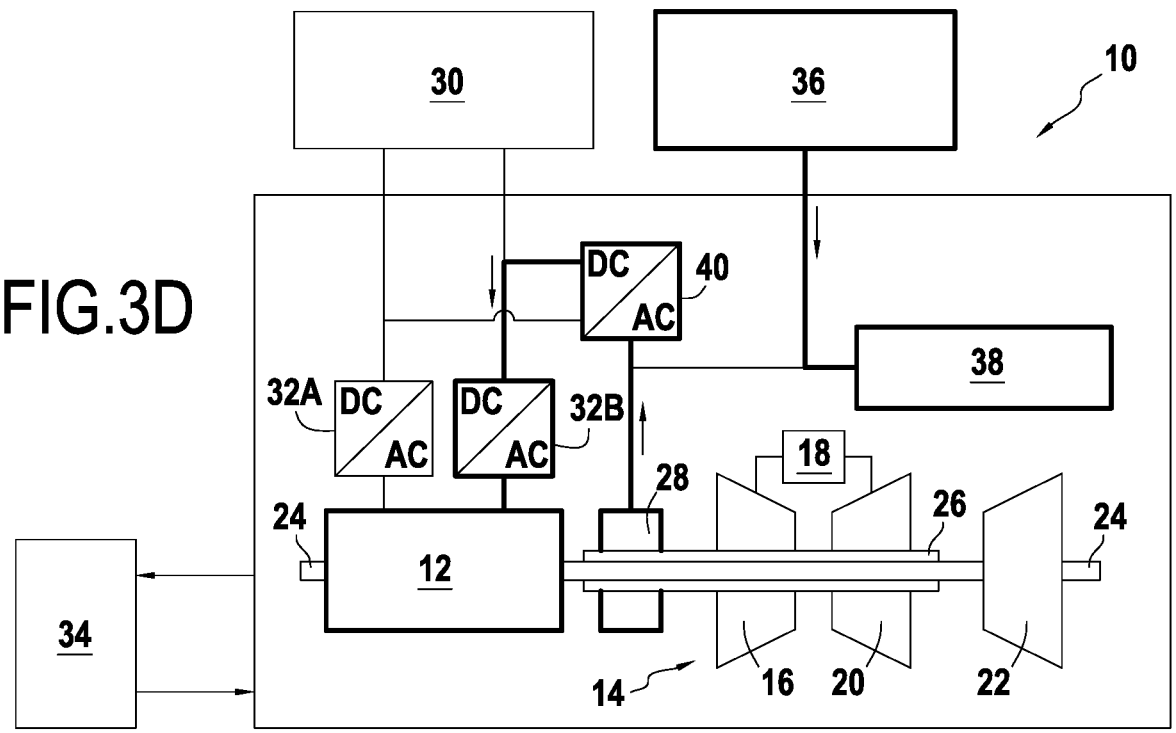

If in normal mode, a problem is detected in a winding of the PMG 12, the supply to the primary power supply network 30 is stopped and there is a switch to an internal fault mode (PMG Internal Fault—FIG. 3D). The PMS/G 28 is then used to deflux the PMG 12 via the winding of the safe PMG, the first AC/DC converter 32B associated with this safe winding and the second AC/DC converter 40. This allows limiting the effects of the internal fault while stopping the turbogenerator (cut off the gas turbine and the primary network supply). This defluxing of the PMG of course assumes that this generator is polyphase and that the fault detected is an inter-turn short-circuit or a phase-to-phase or phase-to-neutral short-circuit between the machine and the converter.

In the event of a fault in one of the two first converters 32A, 32B, the turbogenerator enters into degraded mode (degraded—FIG. 3E) in which the first faulty converter (the converter 32A in the drawing) is isolated, the second converter 40 substituting it to provide power to the primary power supply network 30 and the other first converter 32B continuing to provide power to the primary network 30. The available power is however lower than the nominal power. The secondary power supply network 36 and the auxiliary equipment 38 remain supplied from the PMS/G 28.

Finally, upon switching into stop mode (stop—FIG. 2) following a corresponding request, the turbogenerator is stopped like a conventional turbomachine.

It should be noted that some of the connections only constitute a preferred exemplary embodiment and that several variants are in particular possible at the connection of the secondary power supply network, the auxiliary equipment and the second bidirectional AC/DC converter.

With this aeronautical turbogenerator architecture according to the invention, the following functions are ensured:

Starting of the gas generator,
Generation of the primary, secondary and auxiliary powers,
Power transfer between the HP and LP shafts,
Degraded mode in the event of a converter fault,
Protection against the internal faults of the PMG,
Protection against the charge releases.

The invention claimed is:

1. An electrical power generation system for an aircraft, including a gas turbine having a high-pressure shaft and outputting a gas flow to actuate a free turbine,
    wherein it further includes a polyphase permanent magnet generator coupled to the gas turbine and able to output a first alternating voltage for supplying through first conversion means a primary power supply network of the aircraft, the free turbine and the polyphase permanent magnet generator being mounted on the same drive shaft concentric with the high-pressure shaft of the gas turbine, wherein said first conversion means include two first bidirectional AC/DC converters controlled from a management unit, such that when a fault is detected at a winding of the polyphase permanent magnet generator, a first one of the two first bidirectional AC/DC converters associated with the remaining safe winding is still operated,
    a starter mounted on the high-pressure shaft able to ensure the starting of the gas turbine,
    the starter being a permanent magnet starter/generator able to output a second alternating voltage for supplying a secondary power supply network of the aircraft and auxiliary equipment of the gas turbine,
    second conversion means including a second bidirectional AC/DC converter disposed between the permanent magnet starter/generator and the primary power supply network and controlled from the management unit for converting said second alternating voltage into a second direct voltage and said second bidirectional AC/DC converter also being disposed between the starter and the polyphase permanent magnet generator for transferring power from the polyphase permanent magnet generator to the starter and conversely.

2. The system according to claim 1, wherein said management unit includes a monitoring function that allows detecting faults at the winding of the polyphase permanent magnet generator.

3. The system according to claim 2, wherein the detected fault is an inter-turn short-circuit or a phase-to-phase or phase-to-neutral short-circuit between the generator and the AC/DC converter.

4. The system according to claim 1, wherein said primary power supply network includes at least one electrical source or storage unit of the battery or super capacitor type.

5. The system according to claim 1, wherein said secondary power supply network includes at least one electrical source or storage unit of the battery or super capacitor type.

6. An aircraft including an electrical power generation system according to claim 1.

* * * * *